Nov. 27, 1956 W. P. BOOTHROYD 2,772,324

ELECTRICAL SYSTEMS

Filed Sept. 16, 1952

INVENTOR.
WILSON P. BOOTHROYD
BY
Allen V. Hazeltine
ATTORNEY

United States Patent Office 2,772,324

Patented Nov. 27, 1956

2,772,324

ELECTRICAL SYSTEMS

Wilson P. Boothroyd, Huntingdon Valley, Pa., assignor to Philco Corporation, Philadelphia, Pa., a corporation of Pennsylvania Application September 16, 1952, Serial No. 309,831

19 Claims. (Cl. 178—5.4)

Figures 1, 2:
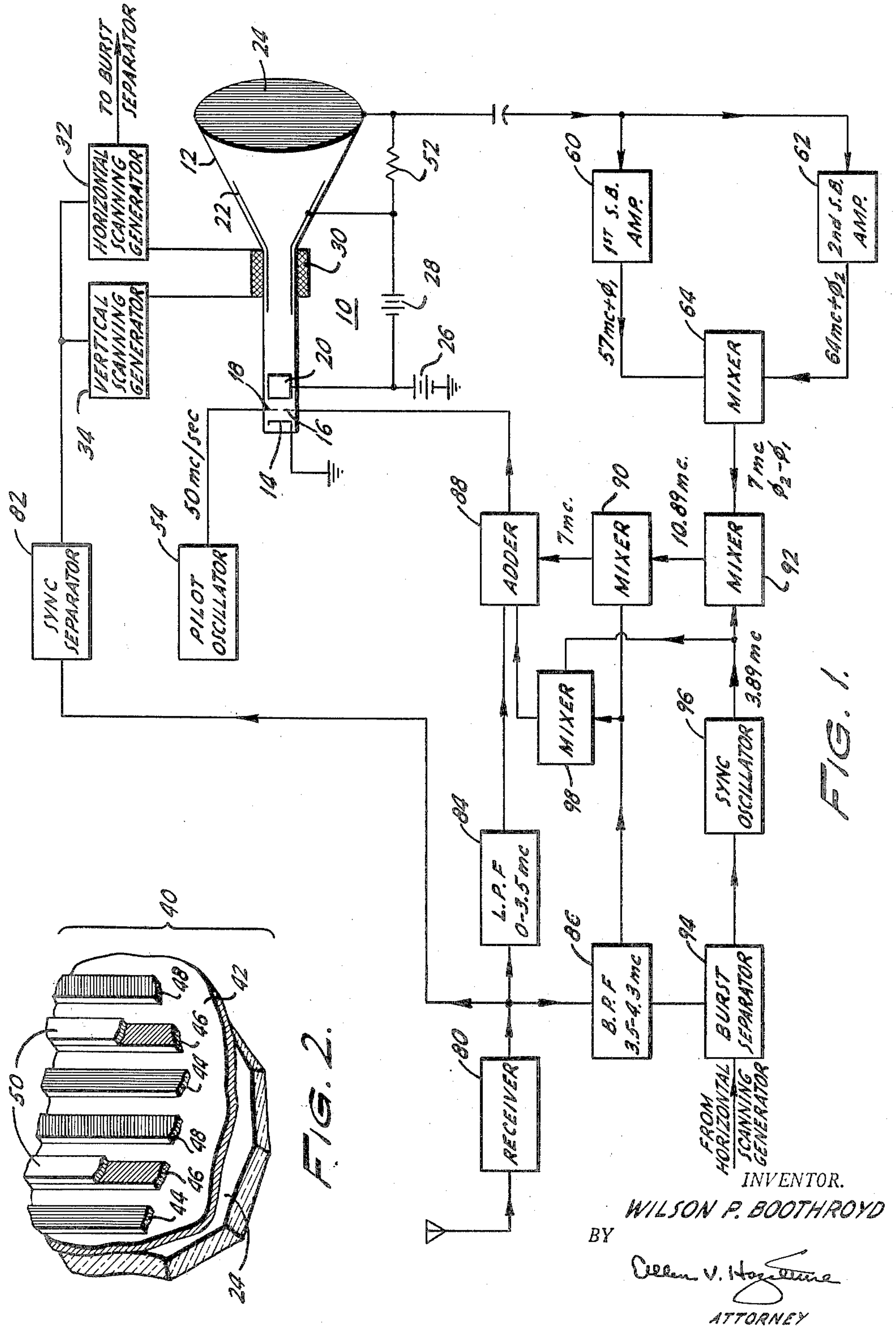

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam.

The invention is particularly adapted for and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals are preferably such as to specify the image colors with respect to three imaginary color primaries "X," "Y" and "Z" as defined by the International Commission on Illumination (ICI). With this choice of primaries, the Y signal represents the brightness of the image as perceived by the human eye, while the X and Z signals contain the remaining intelligence as to image color. Since the specification of any color in terms of any given set of primaries may be converted to a specification of the same color in terms of any other set of primaries by means of linear transformations, the transmission of the X, Y and Z signals makes available at the receiver all of the required information necessary to excite the three real primary-color sources of the image reproducing cathode-ray tube.

In a preferred arrangement for segregating and apportioning the intelligence concerning the X, Y and Z components of the color image at the transmitter, these components are combined to form two difference signals (X—Y) and (Z—Y) which are transmitted in different phase relations as amplitude-modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals (X—Y) and (Z—Y) are zero, i. e., when image elements which are white or gray are scanned. However, when colored image elements are scanned, either or both of the difference signals (X—Y) and (Z—Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered as a chromaticity signal having a phase and amplitude representative of the hue and saturation respectively, of the color of the image.

The instantaneous amplitude of the video signal will be a function of the magnitudes of the three components thereof and of the absolute phase positions of the two components constituting the modulated subcarrier signal, and at any given instant the amplitude is indicative of the intensity of one of the primary color constituents of an element of the image to be reproduced. For proper color rendition, it is required that, as the phosphor stripe producing a given one of the primary colors of light of a particular image element is impinged by the cathode-ray beam, the intensity of the beam be simultaneously controlled in response to the contemporaneous value of the video signal representing the corresponding color component of the televised image. Such a synchronous relationship may be maintained throughout the scanning cycle by deriving indexing signals indicative of the instantaneous position of the cathode-ray beam upon the image-forming screen, and by utilizing these signals to control the relative phase of the video wave. The said indexing signal may be derived from a plurality of stripe portions arranged on the beam intercepting screen structure with a geometric configuration indicative of the geometric configuration of the phosphor stripes so that, when the beam scans the screen, the indexing portions are excited in spaced time sequence relative to the scanning of the color triplets and a series of pulses is generated in a suitable output electrode system of the cathode-ray tube. In one arrangement, the indexing stripe portions may be arranged each adjacent to a color triplet so as to bear a fundamental relationship to the number of the color triplets. Alternatively, the indexing stripe portions may be arranged adjacent to successive groups of color triplets so as to bear a subharmonic relationship to the number of color triplets.

The indexing portions may comprise stripes of a material having secondary-emissive properties which differ from the secondary-emissive properties of the remaining portions of the beam intercepting structure. For example, such indexing portions may consist of stripes of a high atomic number material such as gold, platinum or tungsten or of an oxide such as cesium oxide or magnesium oxide. Alternatively, the screen structure may be provided with a surface layer of a material such as magnesium oxide, having a uniform inherent secondary emissivity and an underlying layer the different portions of which have different electrical conductivity thereby correspondingly modifying the effective electron emissivity of the surface layer. Such an arrangement is described and claimed in the copending application of William E. Bradley and Meier Sadowsky (11–439–A). The indexing portions may also consist of stripes of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements contained in one line scan of the reproduced image and in a typical case there may be approximately 400 to 450 color triplets arranged on the screen of the cathode-ray tube.

As a general rule, the rate at which the beam scans the phosphor stripes and the associated indexing portions can be maintained constant only within certain tolerance values. This is due to the fact that the phosphor stripes and the indexing portions are normally deposited on the screen surface with only a certain degree of precision dictated by economic considerations and manufacturing tolerances so that a non-uniform distribution of the stripes on the screen surface can normally be expected. Furthermore, in order to achieve a uniform scanning velocity, it is necessary that the beam deflection signal conform absolutely to a pre-established wave form determined by the geometry of the tube. In this connection, it will be noted that, when the cathode-ray tube is sufficiently long and/or has a sufficiently small screen area so that the normally aspheroidal screen surface is in effect concentric to the effective deflection center of the scanning beam, the deflecting signal must exhibit a linearly varying amplitude. When the screen has approximately 400 color triplets arranged thereon, this linearity must be held to a tolerance of the order of one part in 12,000 to achieve faithful color reproduction. In practice, this problem is much more severe because, desirably, the cathode-ray tube is made relatively short and/or has a large screen area so that the aspheroidal surface of the screen departs considerably from concentricity to the effective deflection center of the beam. In this case, the deflection of the beam at constant velocity over the surface of the screen requires a deflection signal having a more complex waveform and the difficulty of generating such a signal within the necessary close tolerance value is correspondingly increased.

The departures from constant velocity as the beam scans the screen structure produces corresponding changes in the frequency of the indexing signal produced by the screen structure.

In the copending application of E. M. Creamer, Jr. et al., Serial No. 240,324, filed August 4, 1951, there have been described systems by means of which the desired indexing information can be obtained in a readily usable form. More particularly, and in accordance with the principles set forth in the said copending application, use is made of the finding that the scanning of the indexing stripes by the electron beam produces, in the collector circuit of the cathode-ray tube, signal components which represent modulation products as determined by the intensity variations of the beam and the rate of scanning of the index stripes. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products determined by the pilot carrier frequency and the rate of scanning the index stripes. Because the frequencies of these modulation products are widely different from the frequencies of any modulation products brought about by the video signal variations of the beam, the former may be separated from the latter by suitable frequency discriminating means. These pilot carrier modulation products consist essentially of a carrier wave at the pilot carrier frequency and sideband signals representing the sum and difference of the pilot carrier frequency and the rate of scanning the index stripes. Since changes in the rate of scanning the index stripes will be indicated by a change in the frequencies of the sideband signals, the separated signal or one of its sidebands may be used as an indexing signal.

The indexing signal generated by the action of the scanning beam on the screen structure, is a low intensity signal and must be appropriately amplified to make it suitable for controlling the phase of the video signal applied to the beam intensity controlling system in the desired synchronous relationship to the position of the scanning beam. In addition, it is desirable to filter and limit the generated indexing signal to separate it from undesired components also generated at the screen structure by the scanning beam. The selective circuits commonly available for these purposes generally apply a phase shift to the indexing signal which varies as a function of the frequency thereof so that the processed indexing information may no longer have the same form as the generated indexing information for all frequency values of the generated signal. In some instances, these undesired phase variations of the processed indexing signal may be sufficient to produce a serious error of color synchronization between the position of the beam and contemporaneous value of the color video signal applied to the intensity control system of the cathode-ray tube.

It is an object of the invention to provide improved cathode-ray tube systems of the type in which the position of an electron beam on a beam intercepting screen structure is indicated by an indexing signal derived from an indexing component of the screen structure.

Another object of the invention is to provide improved cathode-ray tube systems in which undesired phase variations of the indexing signal normally produced in the processing of the indexing signal are obviated.

A further object of the invention is to provide an improved index signal producing system for cathode-ray tubes, in which system phase variations of the indexing signal normally produced in the processing of the indexing signal may be compensated to any desired degree.

Another object of the invention is to provide a color television cathode-ray reproducing system in which accurate color rendition is achieved notwithstanding nonuniformities of the distribution and of the scanning of the color reproducing elements of the image screen of the cathode-ray tube.

Still another object of the invention is to provide improved indexing signal producing systems for cathode-ray tubes in which undesired signal components normally generated by the source of the indexing signal are attenuated at low amplitude levels.

Further objects of the invention will appear as the specification progresses.

In accordance with the invention, the foregoing objects are achieved in a cathode-ray tube system adapted to generate an indexing signal having variations, the nominal time phase positions of which are indicative of the position of the beam, by means of an indexing system in which two sideband components of an indexing signal generated in the manner above described and having nominal frequency values arranged on the same side of the carrier frequency of the indexing signal, are selected and individually processed by amplifying systems which may be of conventional form to produce two signals having the desired amplitude level and each substantially free of remaining components of the generated indexing signal. The two side band components so processed, having a nominal frequency difference equal to or a submultiple of the nominal rate of scanning the color triplets and having frequency variations as determined by variations of the rate of scanning the indexing structure of the tube, are thereafter combined in a heterodyne detector arrangement to produce a difference frequency signal having phase variations equal to the difference of the phase variations imparted to the processed components by the respective amplifying means. In the preferred arrangement of the invention hereinafter to be specifically described, the amplifying systems used for processing the desired sideband components are characterized by having a phase slope characteristic inversely proportional to the order of the sideband component applied to the amplifier so that equal phase variations are applied to both of the sideband components. Under these conditions, the output signal produced by the heterodyne difference frequency detector is substantially free of envelope delay variations.

More specifically, and in accordance with one embodiment of the invention, the first and second order upper sidebands of the generated indexing signal are supplied to separate amplifier systems of conventional design. The two processed signals are then supplied to a heterodyne detector system which produces a difference frequency signal having a nominal frequency equal to the nominal rate of scanning the color triplets and having frequency variations corresponding to variations of the rate of scanning the color triplets. By suitably selecting the phase slope of the amplifier for the first order component equal to twice the phase slope of the amplifier for the second order component, and hence, by correspondingly adjusting the envelope delay of the respective amplified components so that equal phase variations are imparted to the components, the cancellation of phase variations produced by the heterodyne detector may be complete to achieve an output signal having zero value phase variations. Alternatively, a different ratio of the phase slopes may be used to produce an output signal having any desired phase variations making it possible to compensate for phase variations of the indexing information applied thereto by subsequent components of the indexing signal circuit.

The invention will be described in greater detail with reference to the appended drawings forming part of the specification and in which:

Figure 1 is a block diagram, partly schematic, showing one embodiment of a cathode-ray tube system in accordance with the invention; and Figure 2 is a perspective view of a part of one form of an image reproducing screen structure suitable for the cathode-ray tube systems of the invention.

Referring to Figure 1, the cathode-ray tube system there shown comprises a cathode-ray tube 10 containing, within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope which terminates at a point spaced from the end face 24 of the tube in conformity with well established practice. Suitable forms of construction for the dual beam generating system have been described in the copending application of M. E. Partin, Serial No. 242,264, filed August 17, 1951, and a further description thereof herein is believed to be unnecessary. Electrodes 20 and 22 are maintained at their desired operating potentials by suitable voltage sources shown as batteries 26 and 28, the battery 26 having its positive pole connected to the anode 20 and its negative pole connected to a point at ground potential and the battery 28 being connected with its positive pole to electrode 22 and its negative pole to the positive pole of battery 26.

A deflection yoke 30 coupled to horizontal and vertical deflection signal generators 32 and 34 respectively, of conventional design, is provided for deflecting the dual electron beams across the face plate 24 of the tube to form a raster thereon.

The end face plate 24 of the tube 10 is provided with a beam intercepting structure 40, one suitable form of which is shown in Figure 2. In the arrangement shown in Figure 2, the structure 40 is formed directly on the face plate 24. However, it should be well understood that the structure 40 may be formed on a suitable light transparent base which is independent of the face plate 24 and may be spaced therefrom. In the arrangement shown, the face plate 24, which in practice consists of glass having preferably substantially uniform transmission characteristics for the various colors of the visible spectrum, and having a light transparent electrically conductive coating 42 which may be a coating of stannic oxide or of a metal such as silver, having a thickness only sufficient to achieve the desired conductivity, is provided with a plurality of parallely arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which, upon electron impingement, produces red light; the stripe 46 may consist of a phosphor such as zinc orthosilicate, which produces green light; and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the face plate 24, and further details concerning the same are believed to be unnecessary.

Each of the groups of stripes may be termed a color triplet, and, as will be noted, the sequence of the stripes is repeated in consecutive order over the area of the structure 40.

Arranged over consecutive stripes 46 are indexing stripes 50 consisting of a material having a secondary-emissive ratio detectably different from that of the remainder of the structure 40. The stripes 50 may be of gold or of other high atomic number metal such as platinum or tungsten, or may be of an oxide such as magnesium oxide as previously pointed out.

The beam intercepting structure so constituted is connected to the positive pole of battery 28 through a load impedance 52 by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When one of the beams, such as the beam under the control of the electrode 18 is varied in intensity at a pilot frequency, for example by means of a pilot oscillator 54, the so varied beam will generate across the load resistor 52 an indexing signal comprising a carrier component at the pilot frequency and sideband components representing the sum and difference frequencies of the pilot frequency and the rate at which the indexing stripes are scanned by the beam as described in the above-mentioned copending application of E. M. Creamer, Jr., et al.

In a typical case, the pilot frequency variations of the intensity of the beam may occur at a frequency of 50 mc./sec. and, when the rate of scanning the indexing stripes 50 is nominally 7 million per second as determined by the horizontal scanning rate and the number of index stripes 50 impinged per scanning period, a modulated signal at 50 mc./sec., and having first order sideband components nominally at 43 mc./sec. and 57 mc./sec. and second order sideband components nominally at 36 mc./sec. and 64 mc./sec., is produced across the load resistor 52. Changes in the rate of scanning the index stripes 50 due to non-linearities of the beam deflection and/or non-uniformities of the spacing of the index stripes produce corresponding changes in the frequencies of the sideband components about their respective nominal values i. e. the first order sideband components undergo frequency deviations proportional to the variations of the rate of scanning the indexing stripes and the second order sideband components undergo frequency deviations proportional to twice the variations of the rate of scanning the indexing stripes. Accordingly, by appropriately processing the sideband components they may be used to supply the desired indexing information.

In the arrangement specifically shown in Figure 1, the first and second order upper sideband components—i. e., the sideband components at approximately 57 mc./sec. and 64 mc./sec.—are used for supplying the desired indexing information. These sideband components are preferentially selected from the remaining signal components generated across load impedance 52 by means of a first sideband amplifier 60 having a restricted pass band characteristic centered about the nominal frequency of the sideband at 57 mc./sec. and by a second sideband amplifier 62 having a restricted pass band characteristic centered about the nominal frequency of the sideband at 64 mc./sec. Restricted pass band characteristics may be imparted to the amplifiers 60 and 62 in any well known manner, for example by means of a resonant circuit broadly tuned to the frequency of the desired sideband component or by an equivalent filter system.

Because of its relatively narrow bandwidth, amplifier 60 imparts phase variations $\phi_1$ to the signal component transmitted therethrough, which phase variations are determined by the frequency deviations of the processed signal component. Similarly, because of the narrow bandwidth characteristic of amplifier 62, phase variations $\phi_2$ are imparted to the signal as determined by the frequency deviations of the processed signal component.

Thus there is seen to exist, at the output of amplifier 60, a first signal having a nominal frequency of 57 mc./sec., having frequency deviations equal to the variations of the rate of scanning of the indexing stripes and having phase variations $\phi_1$ as determined by the phase slope of the amplifier 60 and by the frequency deviations of the signal. At the output of amplifier 62 there exists similarly a second signal having a nominal frequency of 64 mc./sec., having frequency deviations equal to twice the variations of the rate of scanning the indexing stripes and having phase variations $\phi_2$ as determined by the phase slope of amplifier 62 and by the frequency deviations of the processed signal.

The two signals derived from amplifiers 60 and 62 are supplied to a heterodyne detector or mixer 64.

The heterodyne mixer 64 may be of conventional form and may consist of a dual grid thermionic tube, to the different grids of which the two input signals are supplied. The mixer may also contain an output circuit broadly tuned to the frequency of the desired output signal, whereby the desired heterodyne frequency signal may be preferentially selected. Mixer 64 serves to combine the amplified sideband signals from amplifiers 60 and 62 to produce an output signal having a nominal frequency equal to the difference between the nominal frequencies of the supplied signals, having frequency deviations equal to the difference between the deviations of the supplied signals, and having phase variations equal to $\phi_2-\phi_1$ representing the difference between the phase variations imparted to the respective signals by amplifiers 60 and 62. By judicious selection of the phase slope characteristics of amplifiers 60, 62 so that each of the signals is subjected to equal envelope delay—i. e. by constructing amplifier 60 with a phase slope characteristic equal to twice the phase slope characteristic of amplifier 62—the phase variations $\phi_1$ and $\phi_2$ may be made equal in value so that the difference value $\phi_2-\phi_1$ at the output of mixer 64 becomes equal to zero. The phase slope characteristics of the amplifiers may be adjusted to any desired value in a manner well known to those skilled in the art. For example, when the restricted bandpass characteristics of the amplifiers are brought about by tuned resonant circuits as above specifically described, amplifier 62 may be given a phase slope characteristic of one-half that of amplifier 60 by adjusting the Q value of the resonant circuit of amplifier 62 to an appropriate lower value by suitable damping resistors.

While, in the preferred arrangement of the invention, the phase variations $\phi_1$ and $\phi_2$ are made equal in value so that the output signal of mixer 64 is substantially free of phase variations, in some instances it may be desirable to produce an output signal having predetermined phase variations $\phi_2-\phi_1$ serving to compensate phase variations imparted to the signal in its subsequent processing. This may be achieved by appropriately adjusting the imparted phase variations $\phi_1$ relative to the imparted phase variations $\phi_2$, so that resultant phase variations of the desired magnitude and sign are produced at the output of mixer 64. Thus, by adjusting the imparted phase variations $\phi_2$ to a value greater than the imparted phase variations $\phi_1$, in the manner above described, an output signal may be produced having phase variations effectively of negative value and suitable for compensating variations subsequently applied to the output signal of mixer 64.

The output signal from mixer 64 contains the desired indexing information in the form of frequency variations about its nominal frequency value and may thus be used for establishing the time phase position of the color video wave applied to the control electrode 16 of the cathode-ray tube 10. In one suitable arrangement, the indexing information may be combined with the color video wave in the manner shown in Figure 1.

More particularly, for supplying a color video wave to the control grid 16 of cathode-ray tube 10, there is provided a receiver 80 which may be of conventional design and include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color establishing component of the color video wave, such a marker signal being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave may be formed at the transmitter in a number of different manners. Preferably the video wave is generated at the transmitter in accordance with the principles set forth in the copending application of Frank J. Bingley, Serial No. 225,567, filed May 10, 1951. As described in said application the image to be televised is resolved into three color signals, one of which signals is proportional to the energy distribution of the light emitted by the image as weighted by a color mixture curve having a shape and ordinate scale substantially identical to the shape and ordinate scale of the curve of the relative luminosity of the spectral colors to the eye. The second and third color signals are made proportional, respectively, to the energy distribution of the light emitted by the image as weighted by second and third color mixture curves having shapes and ordinate scales complementing the shape and ordinate scale of the first curve. The first of these signals accordingly defines the brightness of the image elements and is a signal having a relatively large bandwidth, whereas the remaining two signals define, with the first signal, the chromaticity of the image, and need be of but relatively small bandwidth. In one of the systems specifically described in the said Bingley application, the first of the said signals is utilized directly to form one component of the color video wave without being previously modulated, and the second and third signals, modified by the first signal to produce two difference signals, are modulated in phase quadrature on a subcarrier to produce the modulated wave component of the color video wave.

The video color wave is separated into its two components by means of a low pass filter 84 and a bandpass filter 86 whereby, at the output of filter 84, there is derived the low frequency component of the video wave containing the brightness information of the image and, at the output of the filter 86, there is derived the modulated subcarrier component of the video wave indicative of the chromaticity information of the image and the marker signal. The frequency pass bands of the filters 84 and 86 are selected in conformity with the standards of the transmission system, a typical value for the pass band of filter 84 being 0 to 3.5 mc./sec. and for the pass band of filter 86 being 3.5 to 4.3 mc./sec. when the subcarrier frequency of approximately 3.89 mc./sec. is used at the transmitter.

The brightness signal is supplied to the control grid 16 of the tube 10 through an adder 88 having a plurality of inputs and a common output, and consisting, in a typical case, of a plurality of thermionic tubes, the input grid circuits of which are separately energized by the respective input signals applied to the adder and the output anode circuits of which are supplied through a common load impedance.

The chromaticity information is combined with the indexing information and is supplied to the electrode 16 in the manner disclosed and claimed in the copending application of Robert C. Moore, Serial No. 214,995, filed March 10, 1951, and for this purpose there are provided a mixer 90 which forms a second input to the adder 88, a mixer 92 having one input supplied by the mixer 64 and having its output coupled to mixer 90, a burst separator 94, and a synchronized oscillator 96. The heterodyne mixers 90 and 92 may be of conventional form and may each consist of a dual grid thermionic tube as previously described in connection with the mixer 64.

The burst separator 94 operates to separate the marker signal from the video wave by providing a gated path for the applied input signal during the time of occurrence of the marker signal. Such a gate may consist for example, of a dual grid thermionic tube having one control grid which is coupled to the output of the bandpass filter 86 and a second control grid so negatively biased as normally to prevent conduction through the tube. The tube is made conductive at the proper instant, i. e., during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof, i. e., the separator may contain a resonant circuit which is tuned to the frequency of the marker signal and which is connected to the anode of the tube.

The marker signal so provided is applied to the oscillator 96 which is adapted to generate a signal having a frequency and a phase position as established by the frequency and phase position of the marker signal applied to the input thereof. In a suitable form the oscillator 96 may be of the type described in the copending application of Joseph C. Tellier, Serial No. 197,551, filed November 25, 1950.

The output of oscillator 96 at the color sub-carrier frequency of 3.89 mc./sec. is applied to the heterodyne mixer 92, together with the nominally 7 mc./sec. signal at the output of mixer 64, to produce a heterodyne signal at 10.89 mc./sec. which signal has the color phase information as established by the color phase marker signal of the video signal derived from the receiver 80 and has the indexing information as established by the sideband components of the indexing signal derived from the screen structure of the cathode-ray tube. This heterodyne signal is in turn applied to the heterodyne mixer 90 together with the color modulated subcarrier of the video wave as derived from the bandpass filter 86 to produce an output wave at the frequency at which the color triplets of the screen structure are scanned, i. e. at 7 mc./sec. It will be noted that this latter output wave exhibits phase and amplitude variations as determined by the phase and amplitude variations of the color modulated subcarrier derived from the bandpass filter 86, and the absolute phase position of these variations are established by means of the color marker signal and are further established with reference to the scanning rate of the color triplets of the cathode-ray tube by the indexing information as derived from mixer 64.

When the information at the output of the low pass filter 84, and the chromaticity information appearing on the color subcarrier derived from bandpass filter 86, are in terms of the imaginary color primaries X, Y and Z, as in the preferred receiving system above specifically described, it may be necessary to modify these signals to make them conform to the particular real primary colors R, G and B characterizing the phosphor stripes utilized in the screen assembly 40 (see Figure 2) of the cathode-ray tube. This may be accomplished by synchronously detecting the color carrier at a particular phase and adding the detection products in proper relative amounts to the imaginary color primary signals. In Figure 1, the subcarrier wave, as derived from the bandpass filter 86, and a demodulating signal at the subcarrier frequency, as derived from the oscillator 96, are synchronously detected by a heterodyne mixer 98 and the detected products so produced are applied as an additional input to the adder 88 to achieve the desired modification of the color signals. The mixer 98, which may consist of a dual grid tube as in the case of the mixers previously described, may include a conventional phase shifter for either or both of the input signals thereof to vary the relative phases of the applied signals and may further include an amplifier in the output circuit to establish the amplitude of the output signal at the proper value relative to the amplitudes of the other signals supplied to the adder 88 from the low pass filter 84 and from the mixer 90. As will be apparent to those skilled in the art, the actual value of the phase shift and the amplification taking place in the mixer 98 is determined by the particular primary colors produced by the cathode-ray tube 10, and these quantities may be readily calculated.

The transformation from a color system based on primaries X, Y and Z to a specific real primary color system may be achieved in ways other than that above specifically described. Such other methods, which form no part of the present invention, need not be specifically described herein. However, for the sake of completeness, reference is made to the copending application of E. M. Creamer, Jr., Serial No. 256,526, filed November 15, 1951, describing several such alternate methods.

Various modifications of the specific embodiment of the invention above described may be readily derived by those skilled in the art without departing from the underlying principles thereof. More particularly, whereas in the system of Figure 1, first and second order upper sidebands of the generated indexing signal are used to provide the desired indexing information, the lower sidebands or other order sidebands differing in frequency by a value equal to the scanning rate of the color triplets may also be used. Furthermore, whereas the invention has been specifically described with reference to its use with a cathode-ray tube, the beam intercepting structure of which comprises indexing lines having a repetition rate equal to the repetition rate of the color triplets, it is evident that the invention is also applicable to systems in which the repetition rate of the indexing stripes is sub-harmonically related to the repetition rate of the color triplets. For example, the invention is equally applicable to a cathode-ray tube system in which an indexing stripe is arranged every three color triplets, in which case the indexing signal generated exhibits a nominal frequency equal to the frequency of the signal applied as a pilot carrier signal to modulate the intensity of the cathode-ray beam, and exhibits sideband components spaced from the carrier frequency of the indexing signal and from each other at nominal frequencies equal to one third of the rate of scanning the color triplets. By means of appropriate bandpass filters, two of these sideband components, having a nominal frequency difference equal to the rate of scanning the color triplets—i. e. the first order and the fourth order upper sidebands—or two sideband components having a nominal frequency difference equal to a sub-multiple of the scanning rate of the color triplets—may be selected and processed in separate channels in the manner of the signals processed by the amplifiers 60 and 62, to produce the desired indexing information devoid of the phase variations normally introduced by the processing circuits. When the sidebands selected in this case have a nominal frequency difference equal to a submultiple of the scanning rate of the color triplets, the difference frequency signal may be adapted to the requirements of the system by means of a frequency multiplier interposed between mixers 64 and 92.

Alternatively, in a system in which the receiver 80 provides three video waves, each indicative of a different one of the primary color components of the image, the signal from the output of the mixer 64, containing the desired indexing information, may be used as a modulating or switching signal to consecutively apply the color video waves to the control electrode 16 through suitable modulators energized by the respective video waves and by the indexing signal applied thereto through appropriate phase shifters.

While I have described my invention in a specific embodiment and by means of specific examples, I do not wish to be limited thereto, for obvious modifications will occur to those skilled in the art without departing from the spirit and scope of the invention.

What I claim is:

1. An electrical system comprising means to produce a first signal having a carrier component having a given nominal frequency value and having a plurality of sideband components each undergoing frequency variations about a respective nominal frequency value different from the nominal frequency value of said carrier component, first signal channel means for selectively deriving from said signal one of said sideband components, said channel means having a signal transmission characteristic imparting to said derived sideband component phase variations as determined by the frequency variations thereof, second signal channel means for selectively deriving from said signal another of said sideband components, said second channel means having a signal transmission characterisic imparting to said derived other sideband component phase variations as determined by the frequency variations thereof, and heterodyne means coupled to said first and second channel means for combining said derived sideband components thereby to produce an output signal having a nominal frequency value equal to the difference between the nominal frequency values of said derived sideband components, having frequency variations equal to the difference between the frequency variations of said derived sideband components and having phase variations equal to the difference between the phase variations of said derived sideband components.

2. An electrical system as claimed in claim 1 wherein said first and second signal channel means are adapted to selectively derive the first and second order sideband components of said first signal.

3. An electrical system as claimed in claim 1 wherein said selective signal channel means are adapted to impart substantially equal phase variations to said derived sideband components, whereby said imparted variations are substantially canceled in said heterodyne combining means.

4. An electrical system as claimed in claim 1 wherein one of said selective signal channel means is adapted to impart to one of said sideband components phase variations of given magnitude and the other of said selective signal channel means is adapted to impart to the other of said sideband components phase variations of greater magnitude.

5. A cathode-ray tube system comprising a cathode-ray tube having a member adapted to intercept charged particles, means to generate charged particles and to direct the same in beam formation towards said intercepting member and means to vary the flow of said particles from said generating means, said intercepting member having first portions thereof arranged in a given geometric configuration and having a first response characteristic upon impingement by said charged particles, said member further having second portions thereof arranged in a second geometric configuration indicative of said first configuration and having a second response characteristic upon impingement by said particles different from said first characteristic, means to scan said charged particles in beam formation across said intercepting member at a given nominal rate thereby to energize said first and second portions, means to vary the flow of said charged particles from said generating means at a given rate, means to derive from said intercepting member a first signal having a carrier frequency determined by the said rate of varying the flow of said charged particles and having sideband signal components, said sideband components having nominal frequency values determined by the nominal rate of scanning said second portions and having frequency variations determined by variations of the rate of scanning said second portions, first means to selectively derive from said first signal one of said sideband components, second means to selectively derive from said first signal another of said sideband components, said first and second selective means imparting to said derived sideband components phase variations as determined by the frequency variations of said sideband components, and means to combine said derived sideband components to produce an output signal having a nominal frequency value equal to the difference between the nominal frequency values of said derived sideband components, having frequency varaitions equal to the difference between the frequency variations of said derived sideband components, and having phase variations equal to the difference between the phase variations of said derived sideband components.

6. A cathode-ray tube system as claimed in claim 5 comprising means to further vary the flow of said charged particles in accordance with desired variations of said response of said first portions and at a rate less than said given rate.

7. A cathode-ray tube system as claimed in claim 5 wherein said first portions of said intercepting member are in the form of stripes, wherein said second portions of said intercepting member are in the form of spaced stripes, the stripes of said first and second portions having repetition rates bearing a whole number relationship, wherein said selective deriving means are adapted to select two of said sideband components, and wherein the nominal frequency difference of said sideband components and the nominal rate of scanning said stripes of said first portions bear a whole number relationship.

8. A cathode-ray tube system as claimed in claim 7 wherein the number of said stripes of said first portion is equal to the number of stripes of said second portions and wherein said selective deriving means are adapted to select two of said sideband components having a nominal frequency difference substantially equal to the nominal rate of scanning said stripes of said first portion.

9. A cathode-ray tube system as claimed in claim 5 further comprising means for utilizing said output signal to further vary the flow of said charged particles at a rate established by the frequency of said output signal.

10. A cathode-ray tube system comprising a cathode-ray tube having a member adapted to intercept charged particles, means to generate charged particles and to direct the same in beam formation toward said intercepting member and means to vary the flow of said particles from said generating means, said intercepting member having first elemental areas thereof arranged in a given geometric configuration and having a first response characteristic upon impingement by said charged particles, said member further having second elemental areas thereof arranged in a second geometric configuration indicative of said first configuration and having a second given response characteristic upon impingement by said particles different from said first characteristic; means to scan said charged particles in beam formation across said intercepting member at a given nominal rate to thereby energize said first and second elemental areas; means to vary the flow of said charged particles from said generating means at a given rate; means to derive from said intercepting member a first signal having a carrier frequency determined by the said rate of varying the flow of said charged particles and having sideband components, said sideband components having nominal frequency values determined by the rate of scanning said second portions and having frequency variations about the said nominal frequency values determined by variations of the rate of scanning said second portions; a first frequency selective amplifier system supplied with said first signal and having a band-pass characteristic adapted to selectively transmit one of said sideband components and to attenuate other components of said first signal; a second frequency selective amplifier system supplied with said first signal and having a bandpass characteristic adapted to selectively transmit another of said sideband components and to attenuate other components of said first signal, said amplifier systems each imparting to the sideband component transmitted thereby phase variations as determined by the frequency variations of the transmitted component; heterodyne frequency detecting means coupled to said amplifier systems for combining said transmitted components to produce an output signal having a nominal frequency value substantially equal to the difference between the nominal frequencies of said transmitted components, having frequency variations equal to the difference between the frequency variations of said transmitted components, and having phase variations substantially equal to the difference between the phase variations of said transmitted components; and means for utilizing said output signal to further vary the flow of said charged particles at a rate determined by the frequency of said output signal.

11. A cathode-ray tube system as claimed in claim 10 wherein said first elemental areas have a repetition rate equal to the repetition rate of said second elemental areas, and wherein said frequency selective systems are adapted to select two sideband components having a nominal frequency difference equal to the nominal rate of scanning said first elemental areas.

12. A cathode-ray tube system as claimed in claim 11 wherein said frequency selective systems are adapted to transmit the first and second order sidebands of said first signal.

13. A cathode-ray tube system as claimed in claim 10 wherein said second elemental areas have a repetition rate sub-harmonically related to the repetition rate of said first elemental areas.

14. A cathode-ray tube system as claimed in claim 13 wherein said frequency selective systems are adapted to transmit the first and fourth order sidebands of said first signal.

15. A cathode-ray tube system for reproducing a color television image as defined by a color video wave having first and second components indicative of visual aspects of said image; said system comprising a cathode-ray tube having an electron beam intercepting member, means to generate electrons and to direct the same in beam formation towards said beam intercepting member and means to vary the flow of electrons from said generating means, said intercepting member comprising first portions each comprising a plurality of stripes of fluorescent material arranged in substantially parallel relationship, said stripes being adapted to produce light of different colors in response to electron impingement, and said member further comprising second portions spaced apart substantially parallel to said fluorescent stripes and having a response characteristic upon electron impingement different from the response characteristic of said first portions; means to scan said electrons in beam formation across said beam intercepting member at a given nominal rate to thereby energize said first and second portions; a source of a first signal coupled to said tube to vary the flow of electrons from said generating means at a first given frequency; means to derive from said intercepting member a second signal having a carrier frequency determined by the frequency of said first signal and having sideband components, said sideband components having nominal frequency values determined by the rate of scanning said second portions and having frequency variations about said nominal values determined by variations of the rate of scanning said second portions; first frequency selective amplifying means energized by said second signal and having a bandpass characteristic adapted to selectively transmit one of said sideband components and to attenuate other signal components of said second signal; second frequency selective amplifying means energized by said second signal and having a bandpass characteristic adapted to selectively transmit another of said sideband components and to attenuate other signal components of said second signal, said amplifying means each imparting to the sideband component transmitted thereby phase variations as determined by the frequency variations of the said transmitted component; heterodyne frequency detecting means coupled to said amplifying means and adapted to produce an output signal having a nominal frequency value equal to the difference between the nominal frequency values of said transmitted components, having frequency variations equal to the difference between the frequency variations of said transmitted components and having phase variations equal to the difference between the phase variations of said transmitted components; and means for utilizing said output signal to said cathode-ray tube to further vary the flow of said electrons at a rate determined by the frequency of said output signal.

16. A cathode-ray tube system as claimed in claim 15 wherein said second component of said video wave is characterized by having amplitude and phase variations and further comprising means responsive to said output signal to control the time phase position of said variations.

17. A cathode-ray tube system as claimed in claim 16 wherein the repetition rate of said second portions is equal to the repetition rate of said first portions, wherein said selective transmission means are adapted to transmit the first and second order sidebands of said second signal whereby the said output signal has a nominal frequency value equal to the rate of scanning said first portions.

18. An electrical system as claimed in claim 1 wherein said first and second signal channel means are adapted to selectively derive the first and second upper sideband components of said first signal.

19. An electrical system comprising means to produce a first signal having a carrier component of given nominal frequency value and having a plurality of sideband components subject to frequency variations about nominal frequencies different from the nominal frequency value of said carrier component, first signal channel means for selectively deriving from said signal one of said sideband components, said channel means having a signal transmission characteristic imparting phase variations to said derived sideband component, second signal channel means for selectively deriving from said signal another of said sideband components, said second channel means having a signal transmission characteristic imparting to said derived other sideband component phase variations having a predetermined relation to the phase variations imparted by said first signal channel means, heterodyning means coupled to said first and second channel means for combining said derived sideband components, and means to derive from said heterodyning means an output signal having a nominal frequency value equal to the difference between the nominal frequency values of said derived sideband components, said output signal further having frequency variations equal to the difference between the frequency variations of said derived sideband components and having phase variations equal to the difference between the phase variations of said derived sideband components.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,621,244 | Landon | Dec. 9, 1952 |
| 2,648,722 | Bradley | Aug. 11, 1953 |